UNITED STATES PATENT OFFICE.

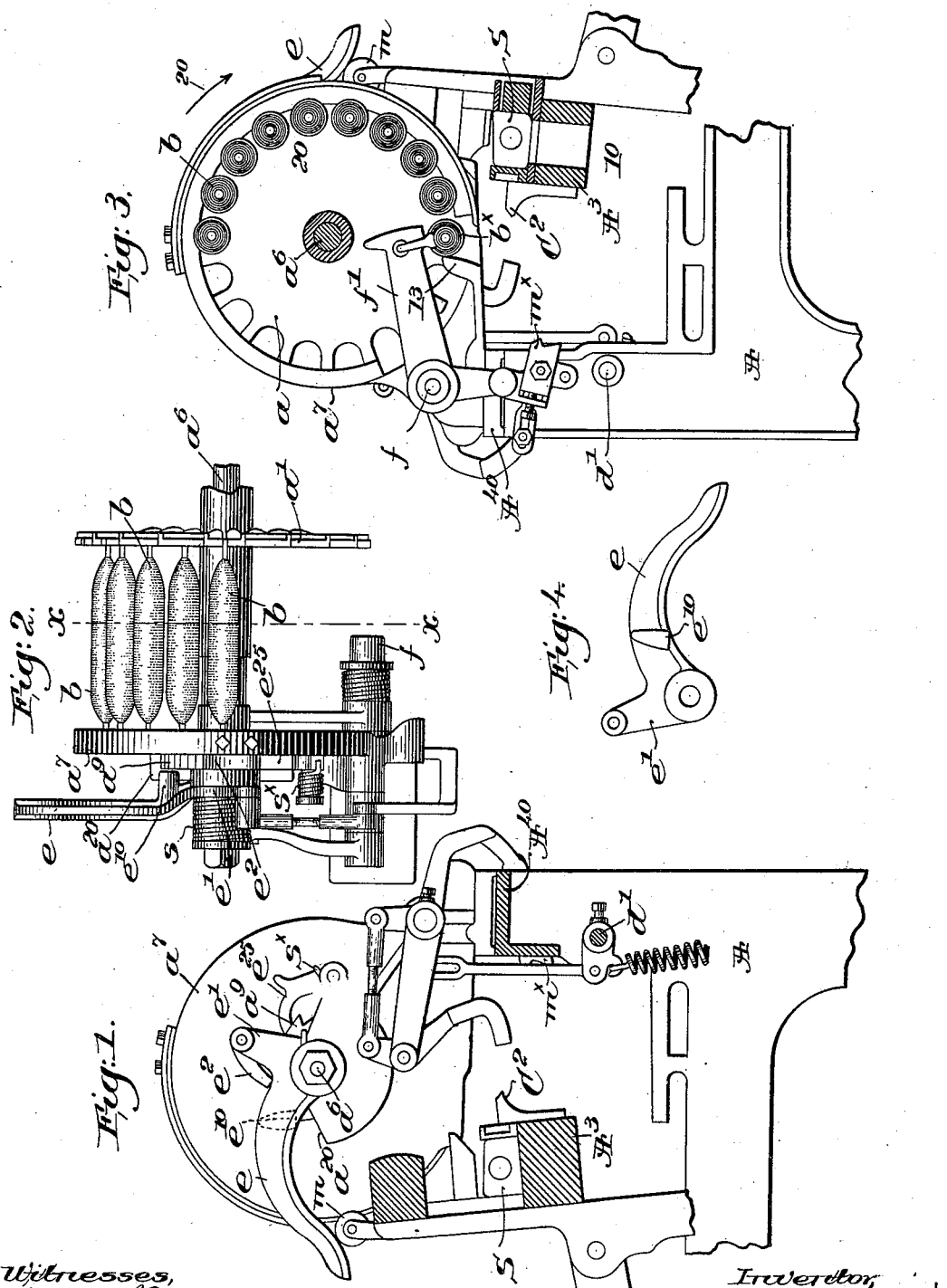

ALVAH W. CLEMENT, OF HOPEDALE, MASSACHUSETTS, ASSIGNOR TO THE DRAPER COMPANY, OF SAME PLACE AND PORTLAND, MAINE.

FILLING-SUPPLYING MECHANISM FOR LOOMS.

SPECIFICATION forming part of Letters Patent No. 627,803, dated June 27, 1899.

Application filed April 5, 1899. Serial No. 711,766. (No model.)

*To all whom it may concern:*

Be it known that I, ALVAH W. CLEMENT, of Hopedale, county of Worcester, and State of Massachusetts, have invented an Improvement in Filling-Supplying Mechanism for Looms, of which the following description, in connection with the accompanying drawings, is a specification, like letters and figures on the drawings representing like parts.

In that type of looms provided with mechanism for automatically supplying fresh filling as it is needed the several filling-carriers are separately held in a movable feeder, means being provided to move said feeder intermittingly to bring the filling-carriers one by one into position to be removed or transferred at the proper time.

One form of automatic filling-supplying mechanism is shown in United States Patent No. 529,940, dated November 27, 1894, wherein the filling-carriers are held in a circularly-moving feeder which is intermittingly moved by a spring to bring the filling-carriers into position in the path of a transferrer. When transfer of filling has been effected, the spring acts to partially rotate the feeder until the filling-carrier next to be removed engages a fixed stop, and as the spring is quite powerful the filling-carrier receives a hammer blow and has to withstand the shock due to such stoppage of the feeder.

This invention has for its object the production of means for obviating such strain or shock on the filling-carriers.

Figure 1 is a transverse sectional view of a portion of a loom, taken inside of the filling-supplying mechanism with one embodiment of my invention applied thereto. Fig. 2 is a top or plan view of the filling-supplying mechanism shown in Fig. 1. Fig. 3 is a transverse section on the line $x\ x$, Fig. 2, looking toward the left; and Fig. 4 is a detail view of the pawl-carrier to be referred to.

The loom-frame A, lay $A^3$, slotted below one of the shuttle-boxes, as at 10, the breast-beam $A^{40}$, bunter $C^2$, and the self-threading shuttle S may be and are substantially as in the patent referred to, and, as in said patent, the filling-supplying mechanism consists, essentially, of a notched disk or plate $a$ to receive the heads of the filling-carriers $b$ and a second disk $a'$ to hold their tips or small ends. The disks are connected and mounted to rotate in unison on a stud $a^6$, fixed on the stand $a^7$, which is secured to the breast-beam, the disk $a$ having a series of ratchet-teeth $a^9$, Figs. 1 and 2, attached to its hub at the inner face of the stand. The stand is provided with a fixed stop 13, Fig. 3, so located that a filling-carrier in operative position and resting against the stop will be in the path of the transferrer $f'$, mounted on the stud $f$, the controlling mechanism for the transferrer, as herein shown, being substantially the same as in United States Patent No. 568,455, dated September 29, 1896, the dog $m^\times$ being governed as to its position by or through the rock-shaft $d'$ and intervening connections. A pawl-carrier $e$ is herein shown as mounted on the stud $a^6$ at the inner end of the filling-feeder and having an upturned arm $e'$, provided with a pawl $e^2$, adapted to engage the ratchet-teeth $a^9$, a strong spring $s$, Fig. 2, surrounding the stud and being attached at its ends to the stud and pawl-carrier, respectively, the spring tending to depress the pawl-carrier and through the ratchet mechanism to rotate the feeder in the direction of the arrow 20, Fig. 3, when the feeder is free to rotate. Retrograde movement of the feeder is prevented by a detent $e^{25}$, controlled by a spring $s^\times$ and engaging the ratchet-wheel $a^9$. A roller or other projection $m$, herein shown as mounted on a part of the lay, engages the pawl-carrier when the latter is in its lowest position and as the lay moves back travels on the under side of the pawl-carrier, rocking it to wind the spring $s$ and move the pawl $e^2$ to engage a fresh tooth of the ratchet-wheel. When the spring is wound and the parts are in the position shown in Fig. 3, let it be supposed that the filling-carrier $b^\times$ is removed from the feeder by the transferrer when the lay is forward. As the transferrer returns to normal position thereafter, the feeder is free to be rotated by or through the spring $s$ until the next filling-carrier of the series is brought into operative position; but to prevent the shock on such filling-carrier due to its engagement with the stop 13 when the feeder is controlled by the spring I have provided means independent of the filling-carriers to limit the feeding action of the spring $s$. To effect this, I provide the pawl-carrier with a lateral lug or projection $e^{10}$, which in the descent of the pawl-carrier engages a fixed abutment $a^{20}$ on the stand $a^7$ just as or slightly before the filling-carrier reaches its position adjacent the stop 13, so that the shock and hammer blow due to the sudden stoppage of the action of the spring is taken up by the lug $e^{10}$ and the abutment $a^{20}$, and the momentum of the feeder brings the next filling-carrier with but little force against the stop 13. It will be manifest that the outer end of the pawl-carrier will then be in position to be engaged and lifted by the roller $m$ as the lay swings back, thereby winding the spring in readiness for the next feeding movement of the filling-feeder, and as the pawl-carrier is lifted the endmost filling-carrier resting against the stop 13 holds the feeder until the tranferrer is again operated. When the spring is thus wound, the pawl by its engagement with the ratchet-wheel maintains the pawl-carrier lifted substantially in the position shown in Fig. 1, as in United States Patent No. 529,940 referred to.

By the construction herein described the filling-carriers are relieved from shock when the feeding action of the operating-spring is stopped, and the liability of breakage or displacement of the filling-carriers is entirely obviated.

Should two or more filling-carriers be absent from the feeder after transfer, the momentum of the feeder will be sufficient to bring the endmost filling-carrier into position against the stop. The actuating means imparts initial feeding movement to the feeder, and the momentum of the latter completes the feeding movement.

My invention is not restricted to the precise construction and arrangement shown, for so far as I am aware it is broadly new to effect the stoppage of the feed movement of a filling-feeder independently of the filling-carriers mounted therein.

Having described my invention, what I claim as new, and desire to secure by Letters Patent, is—

1. A filling-feeder to hold a series of filling-carriers, actuating means to move it intermittingly to bring the filling-carriers one by one into operative position, means to terminate movement of the actuating means independently of the filling-carriers, and a stop to engage the filling-carrier next to be removed and maintain the feeder at rest.

2. A filling-feeder to hold a series of filling-carriers, a spring to move it intermittingly to bring the filling-carriers singly into operative position, means to terminate such feed action of the spring and take up shock independently of the filling-carriers, and a stop to engage the filling-carrier next to be removed and maintain the feeder at rest.

3. A filling-feeder to hold a series of filling-carriers, a ratchet mechanism, means to actuate it to bring the filling-carriers singly into operative position, a buffer to terminate the movement of the actuating means and take up shock independently of the filling-carriers, and a stop to engage the filling-carrier next to be removed and maintain the feeder at rest.

4. In a loom, the lay, its shuttle-box, a transferrer, a circularly-movable feeder to hold a series of filling-carriers, an attached ratchet, an actuating-pawl therefor and its carrier, movable by or through the lay to move the pawl-carrier in one direction, and a spring to move it in the opposite direction and thereby bring the filling-carriers singly into position to be acted upon by the transferrer, and means to terminate spring-impelled movement of the pawl-carrier independently of the filling-carriers.

5. Filling-supplying mechanism for looms, including a feeder to hold a series of filling-carriers, a transferrer, actuating means to move said feeder intermittingly to bring the filling-carriers singly into position to be acted upon by the transferrer, and means to terminate movement of the actuating means independently of the filling-carriers.

6. A rotatable feeder to receive and hold separately a series of filling-carriers, actuating means to move it intermittingly to bring the filling-carriers singly into operative position, and means to positively stop the actuating means independently of the filling-carriers.

7. A rotatable filling-feeder to receive and separately hold a series of filling-carriers, means to intermittingly actuate the feeder, a stop against which the filling-carrier next to be removed is held while the feeder is at rest, and independent means to stop the feed movement of the actuating means and relieve the filling-carriers of the hammer-blow.

8. A rotatable feeder to receive and hold separately a series of filling-carriers, actuating means to impart initial rotative movement to the feeder to thereby bring the filling-carriers singly into operative position, and means to stop the actuating means before the feeder has completed its feeding movement, the momentum of the feeder thereafter moving it into final position.

In testimony whereof I have signed my name to this specification in the presence of two subscribing witnesses.

ALVAH W. CLEMENT.

Witnesses:
 GEO. OTIS DRAPER,
 ALBERT H. COUSINS.